US011778460B2

(12) United States Patent
Johnson

(10) Patent No.: US 11,778,460 B2
(45) Date of Patent: Oct. 3, 2023

(54) DEVICE AND METHOD FOR AUTHENTICATING TRANSPORT LAYER SECURITY COMMUNICATIONS

(71) Applicant: Giesecke+Devrient Mobile Security America, Inc., Dulles, VA (US)

(72) Inventor: Eric Johnson, Reston, VA (US)

(73) Assignee: Giesecke+Devrient Mobile Security America, Inc., Dulles, VA (US)

( * ) Notice: Subject to any disclaimer, the term of this patent is extended or adjusted under 35 U.S.C. 154(b) by 559 days.

(21) Appl. No.: 16/604,714

(22) PCT Filed: Apr. 14, 2017

(86) PCT No.: PCT/US2017/027544
§ 371 (c)(1),
(2) Date: Oct. 11, 2019

(87) PCT Pub. No.: WO2018/190854
PCT Pub. Date: Oct. 18, 2018

(65) Prior Publication Data
US 2020/0382957 A1 Dec. 3, 2020

(51) Int. Cl.
*H04W 12/06* (2021.01)
*H04L 9/40* (2022.01)
(Continued)

(52) U.S. Cl.
CPC ........... *H04W 12/06* (2013.01); *H04L 63/166* (2013.01); *H04W 12/03* (2021.01); *H04W 12/041* (2021.01); *H04L 63/0435* (2013.01)

(58) Field of Classification Search
CPC ............. H04L 63/0435; H04L 63/166; H04W 12/041; H04W 12/03; H04W 12/06
See application file for complete search history.

(56) References Cited

U.S. PATENT DOCUMENTS 9,071,424 B1   6/2015  Bowness et al.
9,386,045 B2 * 7/2016  Kgil ..................... H04L 63/205
(Continued)

FOREIGN PATENT DOCUMENTS

WO    2014/031328 A1   2/2014

OTHER PUBLICATIONS

Korean Intellectual Property Office, International Search Report and Written Opinion of the International Searching Authority in International Patent Application No. PCT/US2017/027544, dated Dec. 19, 2017.

(Continued)

*Primary Examiner* — Richard A McCoy

(74) *Attorney, Agent, or Firm* — Faegre Drinker Biddle & Reath LLP

(57) ABSTRACT

A secure element of a mobile device receives a first authentication token, which may have an encrypted portion and a non-encrypted portion, from a network gateway device to which the mobile device is connected. The secure element determines whether the first authentication token is valid based on a sequence number included in the first authentication token. If the secure element determines that the first authentication token is valid, the secure element generates a second authentication token that indicates a result of an authentication operation performed by the secure element. The second authentication token is sent to the network gateway device. The secure element derives a pre-shared (Continued)

key using a key derivation function, where the pre-shared key is usable to establish a secure communication channel with the network gateway device.

18 Claims, 9 Drawing Sheets

(51) Int. Cl.
*H04W 12/03* (2021.01)
*H04W 12/041* (2021.01)

(56) References Cited

U.S. PATENT DOCUMENTS

| | | | |
|---|---|---|---|
| 2007/0143614 A1 | 6/2007 | Holtmanns et al. | |
| 2009/0061820 A1* | 3/2009 | Patel | H04L 63/0869 455/411 |
| 2016/0119291 A1 | 4/2016 | Zollinger et al. | |
| 2016/0337861 A1 | 11/2016 | Hawkes et al. | |
| 2017/0195877 A1* | 7/2017 | Lehtovirta | H04W 4/50 |

OTHER PUBLICATIONS

ISO/IEC 9798-2, "Information technology, Security techniques, Entity Authentication, Part 2: Mechanisms using symmetric encipherment algorithms." Second Edition, Jul. 15, 1999.

3GPP TS 33.210 V11.4.0, 3rd Generation Partnership Project; Technical Specification Group Services and System Aspects; 3G Security; Security architecture (Release 11), Sep. 2012.

ANSI X9.63-2001, "Public Key Cryptography for the Financial Services Industry, Key Agreement and Key Transport using Elliptic Curve Crpytography," American National Starndard for Financial Services, 2001.

BSI, Technical Guideline TR-03111, "Elliptic Curve Cryptography," Version 2.0, Jun. 28, 2012, section 4.3.3.

ISO/IEC 9797-1:2007, "Information technology—Security techniques—Message Authentication Codes (MACs), Part 1: Mechanisms using a block cipher," Second Edition, 2007.

The International Bureau of WIPO, International Preliminary Report on Patentability for International Application No. PCT/US2017/027544, dated Oct. 24, 2019.

* cited by examiner

DEVICE AND METHOD FOR AUTHENTICATING TRANSPORT LAYER SECURITY COMMUNICATIONS

FIELD OF TECHNOLOGY

The present disclosure relates generally to mobile communications and, more particularly, to devices and methods for secure communications and authentication of connected devices.

BACKGROUND

In order for two parties to establish a TLS session between two communication devices using pre-shared keys (e.g., using a cipher suite for the Transport-Layer Security (TLS) protocol, such as TLS_PSK_WITH_AES_256_CBC_SHA), both parties must have previously established a shared key. For example, pre-shared key (PSK) is a shared secret key that was previously shared between the two parties using some secure channel before the shared secret needs key to be used.

Some existing techniques for establishing the key for TLS sessions use asymmetric cryptography (e.g., using a Diffie-Hellman key exchange). At least one existing approach is based on using the Universal Mobile Telecommunications Service (UMTS) authentication and key agreement process. This existing approach, however, requires the addition of two IP multimedia services identity module (ISIM) application-dedicated files (ADFs) to a standard universal integrated circuit card (UICC). The UMTS authentication and key agreement process is then run on each of these two ADFs and the resultant data is used as the new shared key.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

An embodiment of the present disclosure relates to a system comprising a secure element of a mobile device, and a network gateway device in communication with the mobile device via a first communication network, where the secure element is configured to: receive a first authentication token from the network gateway device, determine whether the first authentication token is valid based on a sequence number included in the first authentication token, and in response to determining that the first authentication token is valid: generate a second authentication token, where the second authentication token indicates a status of an authentication operation performed by the secure element, send the second authentication token to the network gateway device, and derive a pre-shared key using a key derivation function, where the pre-shared key is usable to establish a secure communication channel with the network gateway device.

Another embodiment of the present disclosure relates to a method comprising: receiving, at a secure element of a mobile device, a first authentication token; determining, at the secure element, whether the first authentication token is valid based on a sequence number included in the first authentication token; in response to determining that the first authentication token is valid: generating, at the secure element, a second authentication token, where the second authentication token indicates a result of an authentication operation performed by the secure element, sending the second authentication token to a network gateway device, and deriving, at the secure element, a pre-shared key using a key derivation function, where the pre-shared key is usable to establish a secure communication channel with the network gateway device.

Yet another embodiment of the present disclosure relates to a non-transitory, computer-readable medium or media storing computer-readable instructions that, when executed by one or more processors, cause the one or more processors to perform operations comprising: receiving a first authentication token; determining whether the first authentication token is valid based on a sequence number included in the first authentication token; in response to determining that the first authentication token is valid: generating a second authentication token, where the second authentication token indicates a result of an authentication operation performed by the one or more processors, sending the second authentication token to a network gateway device, and deriving a pre-shared key using a key derivation function, where the pre-shared key is usable to establish a secure communication channel with the network gateway device.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description.

BRIEF DESCRIPTION OF THE DRAWINGS

These and/or other aspects will become apparent and more readily appreciated from the following description of the embodiments, taken in conjunction with the accompanying drawings of which.

Figure 1:
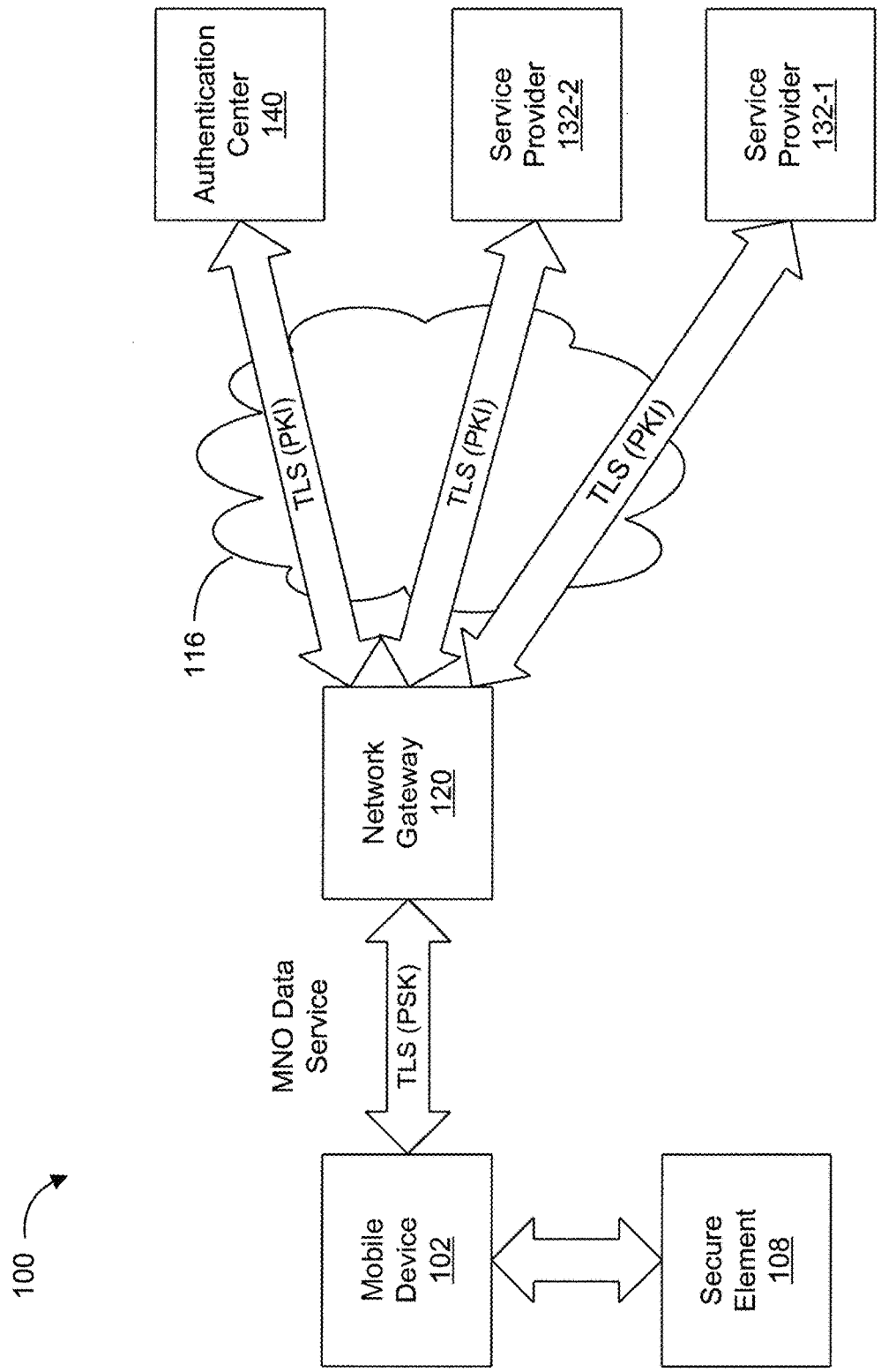
FIG. 1 is a block diagram illustrating an example system for authenticating a connected device and establishing a pre-shared key, according to one or more embodiments described herein.

The headings provided herein are for convenience only and do not necessarily affect the scope or meaning of what is claimed in the present disclosure.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Embodiments of the present disclosure relate to methods, systems, and devices for generating secure keys for confidential communications and authentication of connected devices. The secure keys may be used, for example, to establish secure TLS communications between a connected communication device and a network gateway that is used by the communication device to access Internet-based service providers and services, according to an embodiment. It should be noted that the secure TLS communication provided by the methods and systems described herein may be in addition to any application layer security that is also being used.

According to an embodiment, an authentication and key agreement (AKA) application (sometimes referred to herein as the "AKA application") may be configured to run on a secure element present in a communication device (e.g., mobile device, mobile terminal client, etc.) to establish a pre-shared key between the communication device and a secure network gateway (or secure communication gateway, or simply "secure gateway" for purposes of brevity). For example, in a particular embodiment, the network gateway establishes the shared key with the mobile device using the secure element in the mobile device and an authentication center (e.g., server). The network gateway may periodically request sets of authentication data or credentials (e.g., authentication tuples) from the authentication center such that the process for authenticating the mobile device and establishing a pre-shared key may be performed even when the authentication center is unavailable or inaccessible.

As will be described in greater detail below, the methods, systems, and devices of the present disclosure allow a pre-shared key (PSK) to be initially established and then rotated as necessary. In order to establish this pre-shared key, a network gateway may be assisted by an authentication center entity that already shares a symmetric key with the secure element of the mobile device. In at least one such embodiment, symmetric cryptography is used. For example, the authentication and key agreement process (sometimes referred to herein simply as the "AKA process") described herein may utilize symmetric key techniques to establish a master key that the connected device (e.g., mobile device) may use to set up a secure communication channel (e.g., TLS-PSK channel) with the network gateway. In at least one embodiment, the AKA process results in mutual authentication of the secure element in the mobile device and the authentication center.

The AKA process of the present disclosure may use, for example, advanced encryption standard as the block cipher, according to an embodiment. The individual key used by the secure element of the mobile device may be, for example, 256-bits in length. For example, the individual key of the secure element may be randomly generated during manufacture of the secure element, and stored in the secure element. This individual key of the secure element may be securely distributed or provided to the authentication center in any suitable manner.

The methods and systems of the present disclosure provide numerous advantages over existing AKA-based approaches. For example, the AKA application described herein may be implemented as an applet that is independent of the Mobile Network Operator's (MNO) application that runs on the mobile device. Also, in contrast to existing approaches that generate half of the pre-shared key using one ADF and generate the second half of the pre-shared key using a second ADF, the methods and systems of the present disclosure may generate the pre-shared key in a single step. In addition, the system described herein for authenticating a mobile terminal client (e.g., mobile device) and establishing a pre-shared key may be particularly suited to operate in an environment where there are multiple authentication centers and network gateways, the identities of which may be used in the key derivation function to generate the pre-shared key.

FIG. 1 illustrates an exemplary embodiment of system 100 for authenticating a mobile terminal client (e.g., mobile device) and establishing a pre-shared key. For example, the AKA process may involve various communications between a mobile device 102 (e.g., mobile equipment, mobile terminal client, etc.), a secure element 108, a network gateway 120, and an authentication center (e.g., server) 140. In at least one embodiment, network gateway 120 and authentication center 140 may together constitute a single authentication entity within system 100. For example, at least from the perspective of mobile device 102 and/or secure element 108, authentication center 140 may not be a separate entity from network gateway 120. In other words, to mobile device 102 and/or secure element 108, authentication center 140 may be network gateway 120.

Mobile device 102 (which may also be referred to herein as the "connected" device) is the entity that may access various network services via network gateway 120. For example, mobile device 102 may communicate with network gateway 120 via a mobile network operator (MNO) data service. Examples of mobile device 102 include, but are not limited to, mobile telephones, personal digital assistants, smart phones, tablet computers, laptops and other computers, walkie-talkies, automobiles, household appliances, drones, as well as any other device that may conceivably connect with a telecommunications network. According to an embodiment, the mobile device 102 is authenticated, and a pre-shared key is established, in order to establish a secure communication channel (e.g., TSL(PSK)) between mobile device 102 and network gateway 120. As described in greater detail herein, the transport keys for the communications between mobile device 102 and network gateway 120 may be derived in the AKA process, and may be received by mobile device 102 from secure element 108.

Secure element 108 may be located or installed in mobile device 102. In an exemplary embodiment, all messages sent to (e.g., intended for) secure element 108 may be routed through mobile device 102. According to an embodiment, secure element 108 is a universal integrated circuit card (UICC) or subscriber identification module (SIM), which may be used to authenticate to a MNO and provide the cellular data link for mobile device 102. It should be noted that the AKA application of the present disclosure is separate from any MNO application installed on secure element 108, and is independent of any USIM/ISIM functionality that may be provided by secure element 108. The AKA application described herein may be implemented as an applet (e.g., JavaCard applet configured to run correctly on standards compliant with JavaCard implementations). The secure element may be configured to store an individual key that is used in the AKA process (described in greater detail below). In at least one embodiment, this individual key stored by secure element 108 may also be shared by network gateway 120 and/or authentication center 140.

Network gateway 120 is the interface between mobile device 102 and a communications network 116 (e.g., the Internet). For example, the mobile device 102 may utilize the network gateway 120 to access Internet-based service providers 132-1, 132-2 and services. Network gateway 120 may also be connected to (e.g., in direct and/or secure communication with) authentication center 140. Network gateway 120 may exchange secure communications with authentication center 140 and/or one or more service providers 132-1, 132-2 according to public key infrastructure (PKI), for example.

In an exemplary embodiment, network gateway 120 periodically sends to the authentication center 140 requests for tokens and various other data that may be used in the AKA process, and the authentication center 140 may provide such tokens and other data to the network gateway 120 in response to such requests. When network gateway 120 periodically receives tokens and other authentication data from the authentication center 140 in this manner, the AKA process described herein may be performed even when authentication center 140 is not available or accessible (i.e., when authentication center 140 is offline).

In an exemplary embodiment, authentication center 140 is a server located in a secure environment such that authentication center 140 may contain (e.g., store) the individual keys of secure element 108.

It should be noted that, in some embodiments, system 100 includes more than one network gateway 120 and/or more than one authentication center 140. In such embodiments, each of the one or more network gateways 120 may be associated with a distinct identifier, and each of the one or more authentication centers 140 may also be associated with a distinct identifier.

Figure 2:
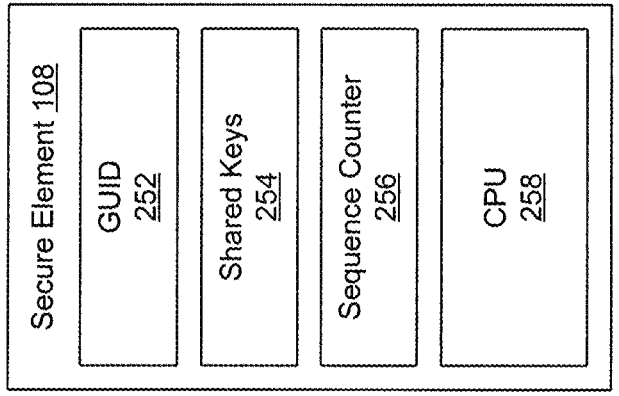
FIG. 2 is a block diagram illustrating an example connected device and an example secure element of the system of FIG. 1, according to one or more embodiments described herein.
Figure 2:
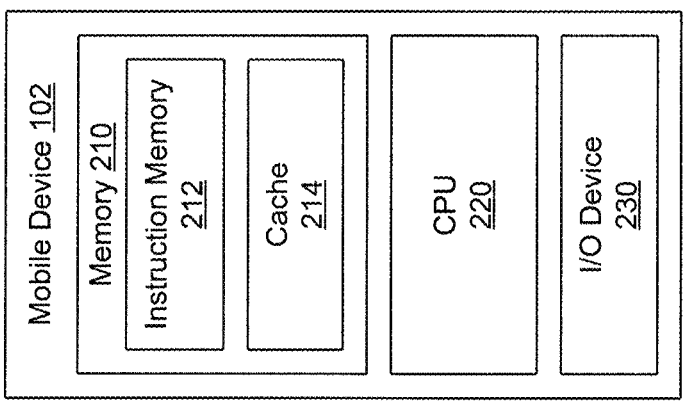

FIG. 2 is a block diagram illustrating various components of mobile device 102 and secure element 108, according to one or more embodiments. As described above, the secure element 108 may be installed in the mobile device 102. In at least one embodiment, the mobile device 102 includes a memory 210, a central processing unit (CPU) 220, and an input/output (I/O) device 230. Memory 210 may include instruction memory 212 configured to store computer-readable instructions that may instruct mobile device 102 to perform various processes or operations. Memory 210 may also include a cache 214 configured to stored data obtained from secure element 108. It should be understood that mobile device 102 may include other components in addition to or instead of the example components shown and described above. Similarly, mobile device 102 may include fewer components than the number of example components shown, or one or more of the example components shown may be combined, without departing from the operations, features, or functionalities of the system and/or mobile device as described herein. For example, CPU 220 of mobile device 102 may serve as secure element 108.

When executed by CPU 220, the computer-readable instructions stored within instruction memory 212 cause CPU 220 to operate as one or more of a plurality of functional components configured to perform one or more of the processes described herein. In some embodiments, such functional components may be implemented on different CPUs 220 within mobile device 102, on different mobile devices 102 altogether, or some combination thereof. I/O device 230 is configured to, for example, transmit information between mobile device 102 and other devices within a telecommunications network, to receive input from a user of mobile device 102, to provide output for a user of mobile device 102, to obtain data and information from and provide data and information to secure element 108, as well as perform various other input/output related tasks involving processes for authenticating mobile device 102 and establishing a PSK.

Secure element 108 (which may be, for example, a UICC or SIM) may function as a memory with a plurality of memory areas. These memory areas may be configured to, for example, store a globally unique identifier (GUID) 252 for secure element 108, store shared key information 254 related to authentication processes for mobile device 102, and store various other data such as authentication token data and identifiers. Secure element 108 may include a processing component, such as CPU 258, an interpreter, a controller, an application specific integrated circuit (ASIC), or other component capable of performing various computational tasks. Examples of secure element 108 include, but are not limited to, SIM cards and any other data carriers that may provide information to the mobile device 108.

In an exemplary embodiment, secure element 108 includes a sequence counter 256 configured to maintain a list of all the authentication centers/network gateways with which secure element 108 has successfully performed the AKA process. A maximum sequence counter increment, L, may be set to control the maximum increase that secure element 108 will allow in a sequence number associated with a network gateway/authentication center combination (GW/AuC). For example, when the authentication center (e.g., authentication center 140 shown in FIG. 1) is requested (e.g., by network gateway 120) to generate a new set of authentication tokens, the authentication center will increment its copy of the sequence counter. As described above, the sequence number, (which will be denoted below by $N_B$), protects against replay attacks. The length of the sequence number may be fixed at, for example, 4 bytes. In such an embodiment, the maximum value for any of the sequence numbers, $N_{max}$, may be $2^{32}-1=0xFFFFFFFF$.

In some embodiments, the AKA process of the present disclosure implements a two-pass mutual authentication in accordance with the International Organization for Standardization (ISO) and International Electrotechnical Commission (IEC) Standard 9798-2 for Information Technology, Security Techniques, and Entity Authentication, and is modeled after the UMTS AKA implementation, but with various changes and improvements as described in greater detail below. In an exemplary embodiment, various system parameters and fields of the 9798-2 two pass mutual authentication process are modified and specialized in the AKA process described herein.

In the following description of FIGS. 3-7, the authentication center (e.g., authentication center 140 shown in FIG. 1 and described in detail above) is denoted as entity "A", and the secure element (e.g., secure element 108 shown in FIGS. 1-2, and described in detail above) is denoted as entity "B".

Figure 3:
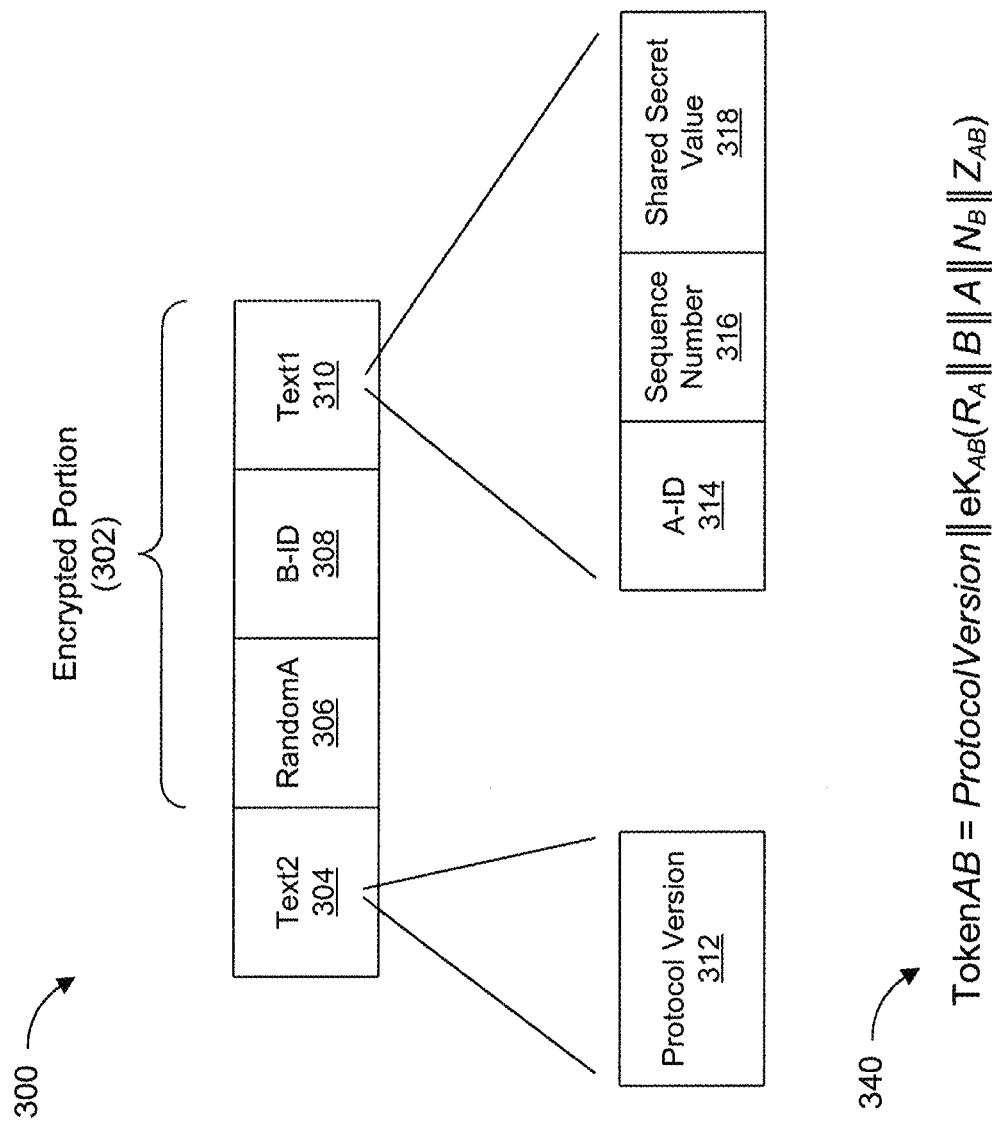
FIG. 3 is a diagram illustrating an example authentication token that may be sent from an authentication center to a secure element in a mobile device, according to one or more embodiments described herein.

FIG. 3 illustrates an example authentication token 300 that may be sent from the authentication center to the secure element. Authentication token 300 may be referred to herein as "TokenAB" since it is provided from communication entity A (authentication center, network gateway, combination AuC/GW, etc.) to communication entity B (secure element). Token 300 may include various parameters and/or fields. In an exemplary embodiment, token 300 includes a first text field 310, a second text field 304, a random number generated by entity A (RandomA) 306, and an identity (e.g., identifier) of entity B (B-ID) 308. First text field 310, B-ID 308, and RandomA 306 may be included in an encrypted portion 302 of token 300. It should be noted that the contents of the text fields (Text1, Text2) are not defined in the ISO Standard 9798-2, and the inclusion of the identity for entity B (B-ID 308) in encrypted portion 302 of token 300 is optional. It should also be understood that encrypted portion 302 of token 300, which includes first text field 310, is securely transported with token 300, and the values of the parameters and fields contained therein cannot be changed or read by an attacker.

The random number generated by the authentication center (RandomA) 306 is included in the token 300 in order to bind the token 300 to the token that is sent from the secure element to the authentication center (TokenBA, which is represented by token 400 in FIG. 4, described in greater detail below). The distinct identifier for the secure element (B-ID 308) is included in token 300 to prevent its re-use (e.g., the re-use of TokenAB) on entity A by an adversary masquerading as the secure element (entity B).

Since the secure element does not determine which authentication center (or authentication center/network gateway (AuC/GW) combination) the secure element is authenticating, the identity of the authentication center (A-ID 314) is included in the token 300, according to an embodiment. To protect against replay attacks, a sequence number 316 for the secure element may be included in token 300. In an exemplary embodiment, the agreed transport key (pre-shared key) is generated once the authentication of the secure element has been completed. For this purpose, the authentication center generates some secret data, or a shared secret value 318, which is included in token 300. Shared secret value 318 may be used in a key derivation function, which will be described in greater detail below. In an exemplary embodiment, the identity of the authentication center (A-ID 314), sequence number 316, and shared secret value 318 are included in first text field 310. A version number for the authentication protocol (protocol version 312) being used in the AKA process may be included in second text field 304.

Another representation 340 of token 300 shows example notations used for the token itself (TokenAB), as well as for various fields of the token described above. The random number generated by the authentication center (RandomA) 306 may be denoted as $R_A$, the identity of the secure element (B-ID 308) may be denoted as B, the identity of the authentication center (A-ID 314) may be denoted as A, the sequence number 316 for the secure element to use to protect against replay attacks may be denoted as $N_B$, the version number for the authentication protocol being used may be denoted as ProtocolVersion, and shared secret value 318 for use in a key derivation function may be denoted as $Z_{AB}$. Some or all of these notations may be referred to in the descriptions that follow.

Figure 4:
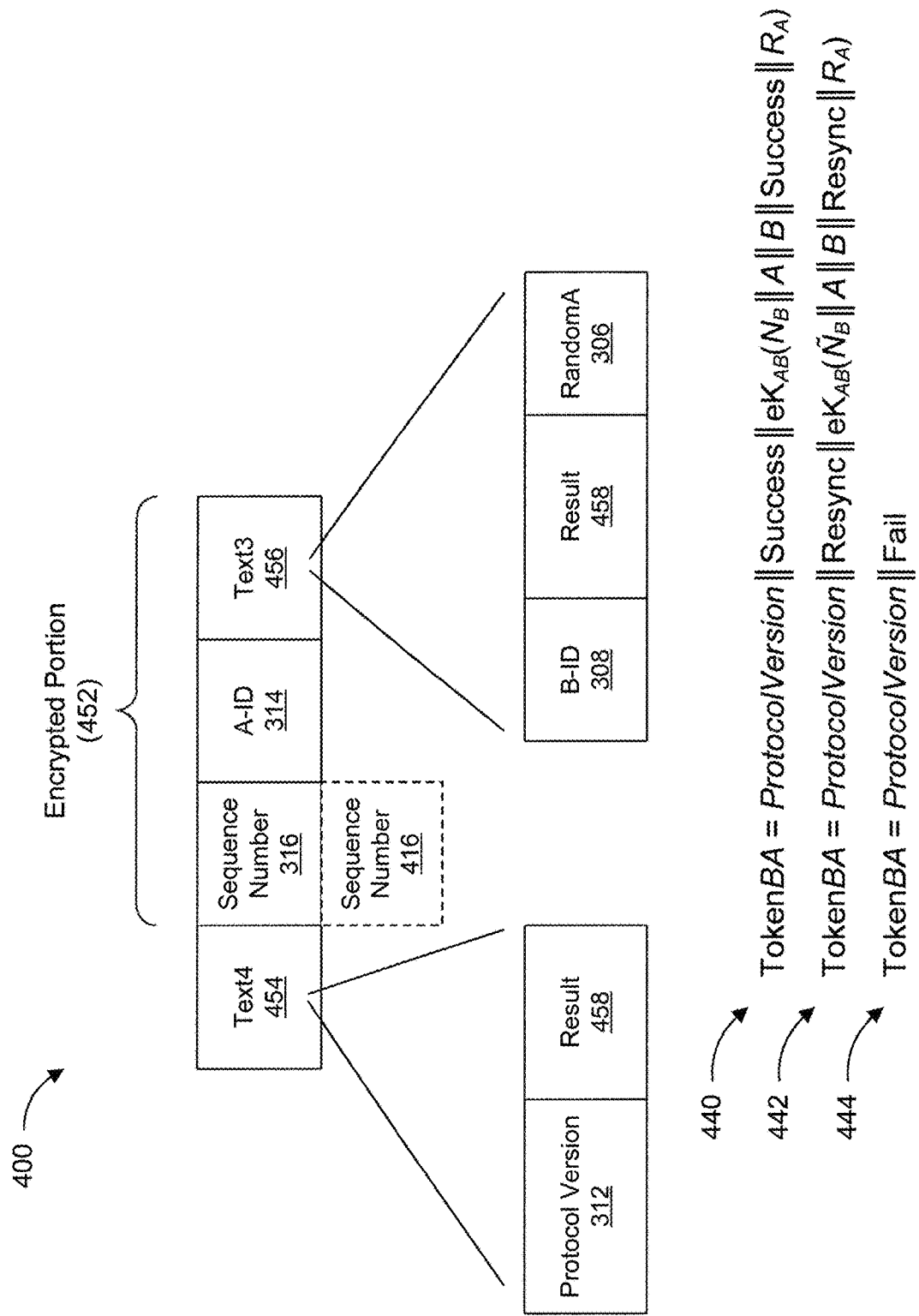
FIG. 4 is a diagram illustrating an example authentication token that may be sent from a secure element in a mobile device to an authentication center, according to one or more embodiments described herein.

FIG. 4 illustrates an example authentication token 400 that may be sent from the secure element to the authentication center, according to one or more embodiments. Authentication token 400 may be referred to herein as "TokenBA" since it is provided from communication entity B (secure element) to communication entity A (authentication center, network gateway, combination AuC/GW, etc.). Token 400 may include various parameters and/or fields. In an exemplary embodiment, token 400 includes a third text field 456, a fourth text field 454, sequence number 316 (e.g., included in token 300 shown in FIG. 3 and described in detail above) from the authentication center for use in defending against replay attacks, and the identity (e.g., identifier) of entity A (A-ID) 314. Third text field 456, A-ID 314, and the sequence number 316 may be included in an encrypted portion 452 of the token 400. It should be noted that the contents of the text fields (Text3, Text4) are not defined in the ISO Standard 9798-2, and the inclusion of the identity for entity A (A-ID 314) in encrypted portion 452 of the token 400 is optional. It should also be understood that encrypted portion 452 of token 400, which includes third text field 456, is securely transported with token 400, and the values of the parameters and fields contained therein cannot be changed or read by an attacker.

As discussed above, the random number generated by the authentication center (RandomA) 306 is included in token 400 in order to bind token 400 to the token that was sent from the authentication center and received at the secure element (TokenAB, which is represented by token 300 in FIG. 3, described in detail above). The distinct identifier for the authentication center (A-ID 314) is included in the token 400 to prevent the re-use of the token 400 (e.g., the re-use of TokenBA) on entity B by an adversary masquerading as the authentication center (entity A).

If the sequence number from the authentication center 316 sent in TokenAB (token 300 of FIG. 3) is incorrect or invalid, then that may be interpreted by the secure element as indicating that the authentication center has an unsynchronized value and resynchronization is thus necessary. To achieve this, the secure element may include a new sequence number 416 in token 400 in place of sequence number 316 that was sent by the authentication center. For example, when the secure element (entity B) receives sequence number 316 from token 300 sent by the authentication center (entity A), the secure element compares the sequence number 316 to a current value stored in a sequence counter of the secure element (e.g., sequence counter 256 in secure element 108 shown in FIG. 2). If the value of sequence number 316 is no more than L larger (e.g., where L is the maximum sequence counter increment, as described above) than the current value stored in the sequence counter, then the secure element may accept sequence number 316 as valid/correct. It should be noted that if the current value stored in the sequence counter of the secure element is close to the maximum permitted value $N_{max}$ permitted by the system, then this comparison/check allows the value to wraparound back to 0.

For example, if c denotes the current value of sequence counter of the secure element, then received sequence number 316 may be determined valid (e.g., correct, acceptable, etc.) if either:

$$c < N_B \leq \min(N_{max}, c+L) \text{ or}$$

$$0 \leq N_8 < c+L-N_{max} \text{ (wraparound case)}$$

If received sequence number 316 is accepted, the secure element will update the sequence counter accordingly. It should be noted that if there is no current value stored in the sequence counter for a given authentication center/network gateway, the secure element may assume a default value of 0 for the current sequence counter. If the secure element has insufficient space to allocate a sequence counter, then an error may be returned.

If all other validations other than the check on the sequence number 316 pass, then, according to an embodiment, the authentication will fail and a resynchronization request will be returned to the network gateway/authentication center. The value of the new sequence number 416 that may be returned with the resynchronization request may be 1 number higher than the current value stored in the sequence counter of the secure element for the particular authentication center/network gateway involved, according to an embodiment. In embodiments where there secure element stores the current sequence number for all authentication center/network gateway pairs, the number of such authentication center/network gateway pairs may be limited.

In some embodiments, the authentication center is configured to keep track of a set of sequence numbers for each secure element/network gateway pair that may be involved in communications with the authentication center. For example, the authentication center may maintain secure numbers for each secure element/network gateway pair in a manner similar to that of the secure element, described in detail above. It should be understood by those of ordinary skill in the art that this is a natural consequence of the system allowing for offline authentication center operation, and to deterministically prevent replay attacks.

In at least one embodiment, a result (or status) of authentication result 458 is included in token 400. Examples of the authentication result 458 that may be indicated in token 400 include "Success" (i.e., if the authentication was successfully completed), "Resync" (i.e., if resynchronization is necessary), and "Fail" (i.e., if the authentication failed completely).

In an embodiment, the identity of the secure element (B-ID 308), the random number generated by the authentication center (RandomA) 306, and the result/status of authentication 458 are included in third text field 456. In at least one embodiment, the result of authentication 458 is also included fourth text field 454, together with protocol version 312 for the authentication protocol being used in the AKA process. Including the result of authentication 458 in third text field 456 ensures that a resynchronization token cannot be used as a success token, for example. It should be noted that in the case where the authentication fails completely, token 400 may not include any encrypted portion 452. It should also be noted that if it is determined that a resynchronization is needed, the AKA process described herein is restarted with updated sequence number 416 (e.g., provided in TokenBA).

Additional representations 440, 442, and 444 of token 400 show example notations that may be used for the token itself (TokenBA), as well as for various fields of the token described above. Representation 440 shows notations that may be used in the case of a successful authentication, representation 442 shows notations that may be used when resynchronization is needed, and representation 444 shows notations that may be used when authentication has failed completely. It should be noted that various notations used in representations 440, 442 are similar to those used in representation 340 of token 300. One notable difference is that new sequence number 416 (denoted as $\tilde{N}_B$) may be generated when resynchronization is needed.

It should be noted that in the case of a successful authentication, there may be no contribution from the secure element (entity B) in the encypted part of the token 400 (e.g., in the encrypted part of TokenBA). In the resynchronization case, the secure element supplies new sequence number 416 (e.g., denoted $\tilde{N}_B$). In such an embodiment, this allows the network gateway to check the response token from the secure element and be sure that it has authenticated the secure element even when the authentication center is offline. In at least one embodiment, the acceptable tokens will have been provided to the network gateway in advance (e.g., by the authentication center).

In some embodiments, if the authentication was successful, both the authentication center (or network gateway or combination AuC/GW) (entity A) and the secure element (entity B) will be in possession of the shared secret value $Z_{AB}$. This shared secret value, together with the identities of the authentication center and the secure element, may be used to generate the pre-shared key. For example, these values may be used with the ANSI X9.63 key derivation function (e.g., the key derivation provided in ANSI X9.63-2011, Public Key Cryptography for the Financial Services Industry, Key Agreement and Key Transport using Elliptic Curve Cryptography) to generate the pre-shared key. In an embodiment, the process described in BSI, Technical Guideline TR-03111, Elliptic Curve Cryptography, Version 2.0 (Jun. 28, 2012) may be used. In an embodiment, the hash function to be used may be SHA-256 and the sharedInfo used may be A∥B. This ensures that the key derivation function is only used to generate a PSK for the specific entities involved (e.g., the secure element and the authentication center). In the following description, the pre-shared key that is generated may be denoted as $K_{PSK}$.

In one or more embodiments, the encryption that may be used to calculate the authentication tokens (e.g., the encrypted portions 302, 452 in FIGS. 3-4, respectively) may be AES-256 in CBC mode, and using a padding method from International Organization for Standardization (ISO) and International Electrotechnical Commission (IEC) Standard 9798-1 for Information Technology, Security Techniques, Message Authentication Codes (MACs), Part 1: Mechanisms using a block cipher (second edition). For example, the data may be padded with a single 1 bit and then as many 0 bits to make a full block.

Figure 5:
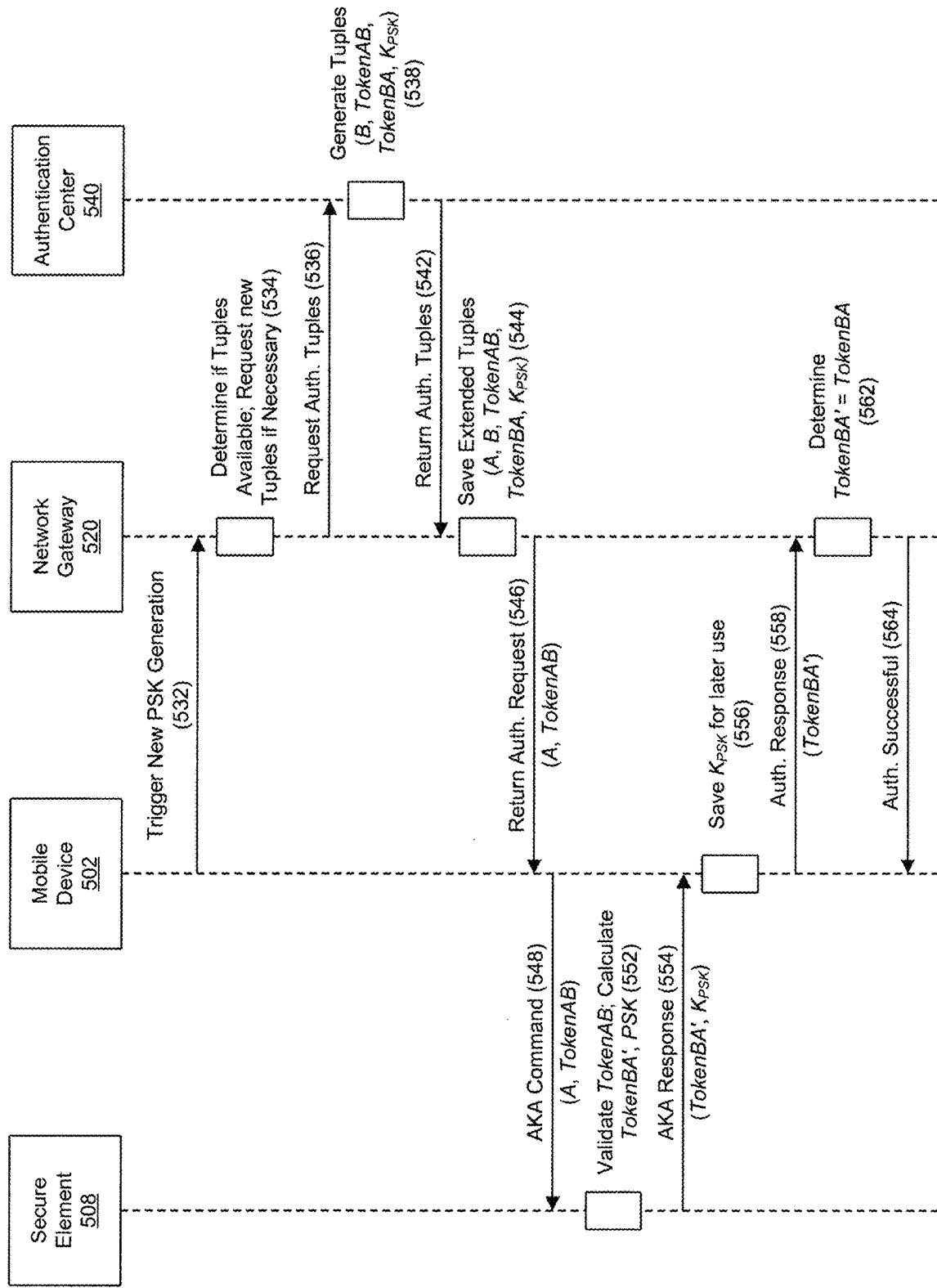
FIG. 5 is a diagram illustrating example data flows in a system for authenticating a mobile device and establishing a pre-shared key when there is a successful authentication, according to one or more embodiments described herein.

FIG. 5 illustrates exemplary data flows between various components in a system for authenticating a mobile terminal client (e.g., mobile device) and establishing a pre-shared key, for a successful authentication. For example, the data flows are shown between a secure element 508, a mobile device 502, a network gateway 520, and an authentication center 540. In at least one embodiment, one or more of secure element 508, mobile device 502, network gateway 520, and authentication center 540 are similar in form and/or function to secure element 108, mobile device 102, network gateway 120, and authentication center 140, respectively, as shown in FIG. 1 and described in detail above.

Mobile device 502 may send a signal (e.g., request) to trigger the generation of a new pre-shared key (532) to network gateway 520. In response to receiving trigger (532) from mobile device 502, network gateway 520 may check (534) to see whether one or more sets of authentication tuples (e.g., authentication tokens, identities of entities, secret shared values, etc.) are available locally at the network gateway 520. In an exemplary embodiment, the system for authenticating mobile device 502 and establishing a pre-shared key is designed to operate even when authentication center 540 is unavailable or inaccessible (i.e., offline). As such, network gateway 520 is configured to periodically request sets of authentication data (e.g., authentication tuples) from authentication center 540 and store these sets of authentication data for instances when the authentication center is unavailable. Network gateway 520 may use the stored sets of authentication data to run the system in a normal manner, provided that resynchronization is not needed. For example, network gateway 520 may request the following sets of tuples from the authentication center:

(B, TokenAB, TokenBA, $K_{PSK}$)

The secure element identity, B, is included in the requested sets of tuples, for management purposes at network gateway 520.

In response to receiving the trigger (532) from mobile device 502, if network gateway 520 determines (534) that one or more sets of authentication tuples are available locally, network gateway 520 can send TokenAB to secure element 508 (e.g., via the mobile device 502) and simply verify that the secure element 508 responds with TokenBA and a "success" indication (e.g., where a status included in the TokenBA indicates a successful authentication). In such an instance, the new pre-shared key value to use is $K_{PSK}$. It should be noted that since TokenBA includes the original sequence number (e.g., sequence number 316, or $N_B$), the comparison serves as a verification of the sequence number by network gateway 520, according to an embodiment.

If network gateway 520 determines (534) that new authentication tuples are needed, network gateway 520 may send a request for authentication tuples (536) to authentication center 540. In response to receiving the request for authentication tuples (536) from network gateway 520, authentication center 540 may generate new authentication tuples (538). In an exemplary embodiment, authentication center 540 generates (538) a set of tuples such as (B, TokenAB, TokenBA, $K_{PSK}$), and returns (542) the set of generated tuples to the network gateway 520. Upon receiving the set of authentication tuples from authentication center 540, network gateway 520 may save (544) an extended set of tuples. Network gateway 520 may saves (544) an extended set of tuples such as (A, B, TokenAB, TokenBA, $K_{PSK}$), which includes the identity, A, of authentication center 540/network gateway 520. Network gateway 520 sends an authentication request (546) to mobile device 502, where the authentication request includes TokenAB, together with an identity A of network gateway 520/authentication center 540.

Upon receiving authentication request (546) from network gateway 520, mobile device 502 may send an AKA command (548) to secure element 508, where the AKA command is sent with TokenAB and identity A. Secure element 508 validates (552) the structure of TokenAB (e.g., in the manner described above) and calculates (e.g., generates) an authentication token TokenBA ' together with a pre-shared key ($K_{PSK}$). Secure element 508 returns an AKA response (554) to the mobile device 502 along with TokenBA' and $K_{PSK}$. Mobile device 502 saves (556) $K_{PSK}$ for later use, and sends an authentication response (558) back to network gateway 520, where the authentication response includes TokenBA' generated by secure element 508. Network gateway 520 determines (562) whether the received TokenBA' matches TokenBA, which was previously stored in the extended tuples (544). If network gateway 520 determines that TokenBA' matches TokenBA, network gateway 520 sends (564) an indication back to mobile device 502 that the authentication is successful.

Figure 6:
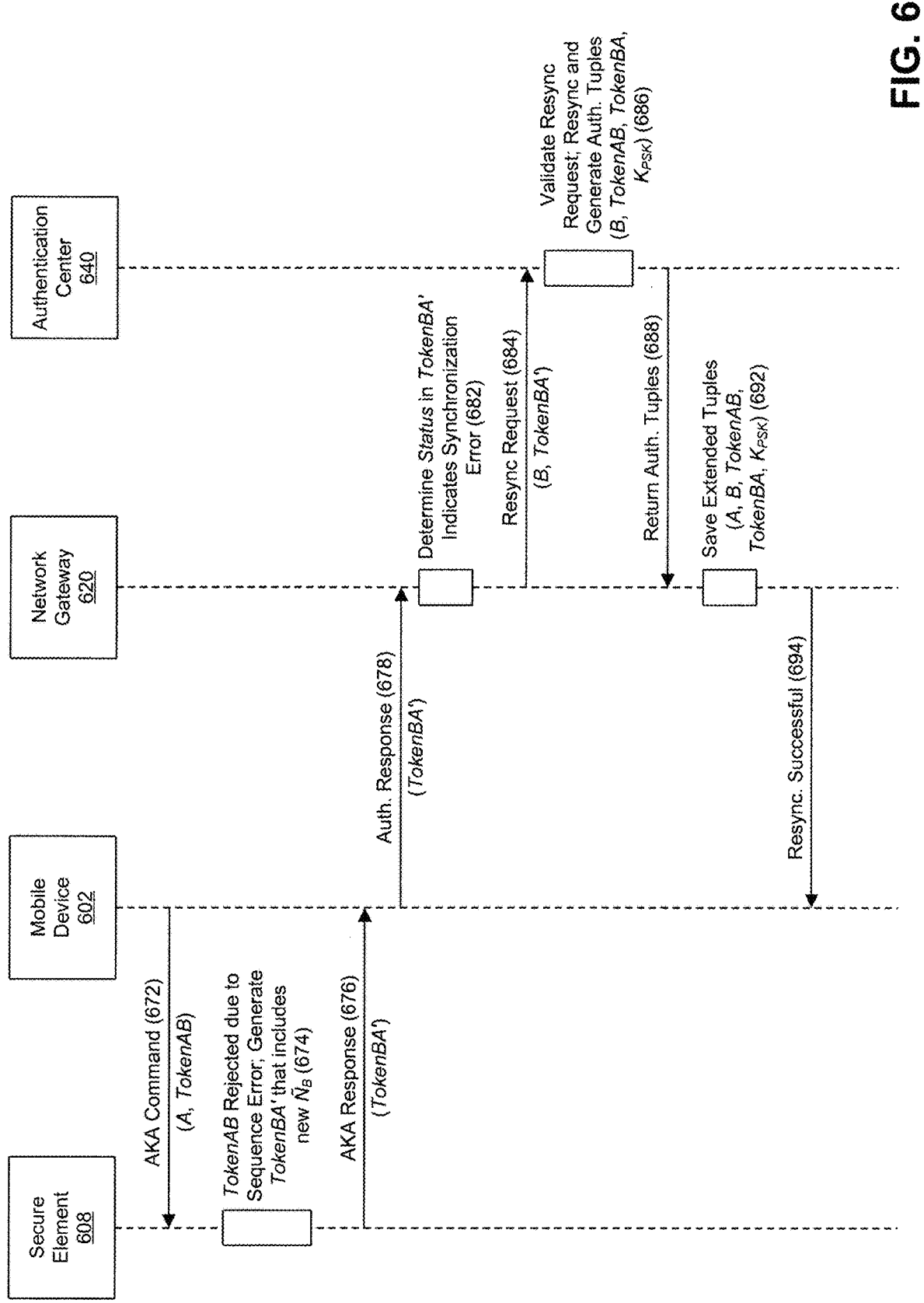
FIG. 6 is a diagram illustrating example data flows in a system for authenticating a mobile device and establishing a pre-shared key when a resynchronization request is made, according to one or more embodiments described herein.

FIG. 6 is a diagram illustrating exemplary data flows in a system for authenticating a mobile device and establishing a pre-shared key when a resynchronization request is made. For example, the data flows are shown between a secure element 608, a mobile device 602, a network gateway 620, and an authentication center 640. In at least one embodiment, one or more of the secure element 608, the mobile device 602, the network gateway 620, and the authentication center 640 is similar in form and/or function to secure element 108, mobile device 102, network gateway 120, and authentication center 140, respectively, as shown in FIG. 1 and described in detail above.

In an embodiment, the mobile device 602 sends an AKA command (672) to secure element 608, where the AKA command is sent with TokenAB (token 300 of FIG. 3) and identity A. For example, mobile device 602 sends the AKA command (672) in response to (or upon) receiving an authentication request from network gateway 620 (e.g., in response to receiving authentication request (546) from network gateway 520 as shown in FIG. 5). Upon analyzing a sequence number (e.g., $N_B$) included in TokenAB, secure element 608 may determine that there is a sequence error in TokenAB, and thus reject TokenAB (674). For example, if the sequence number (e.g., which is provided for inclusion in TokenAB by authentication center 640) sent in TokenAB is determined by secure element 608 to be incorrect or invalid, then that may be interpreted or understood by secure element 608 as indicating that authentication center 640 has an unsynchronized value and resynchronization is thus necessary.

In an exemplary embodiment, when secure element 608 receives AKA command (672) with TokenAB from mobile device 602, secure element 608 may compare the sequence number (e.g., $N_B$) included in TokenAB to a current value stored in a sequence counter of the secure element 608 (e.g., sequence counter 256 in secure element 108 shown in FIG. 2). If the value of the sequence number ($N_B$) is no more than L larger (e.g., where L is the maximum sequence counter increment, as described above) than the current value stored in the sequence counter (or, stated differently, is within a threshold difference of the current value stored in the sequence counter), then secure element 608 may accept the sequence number as valid/correct. On the other hand, if secure element 608 determines that the sequence number included in TokenAB does not satisfy such a criteria, secure element 608 may reject (674) TokenAB.

To achieve resynchronization, secure element 608 may generate (674) TokenBA' to include a new sequence number ($\tilde{N}_B$) in place of the sequence number ($N_B$) that was sent in TokenAB. For example, the value of the new sequence number ($\tilde{N}_B$) that may be included in TokenBA' may be 1 number higher than the current value stored in the sequence counter of the secure element 608 for the particular authentication center 640/network gateway 620 pair involved.

Secure element 608 returns an AKA response (676) to mobile device 602 along with TokenBA It should be noted that, unlike the scenario where the secure element validates the TokenAB (e.g., data flow/operation (552) in FIG. 5), when secure element 608 determines that resynchronization is needed, the AKA response (676) sent to the mobile device 602 only includes TokenBA' and does not include the pre-shared key ($K_{PSK}$). Mobile device 602 sends an authentication response (678) back to network gateway 620, where the authentication response includes TokenBA' generated by the secure element 608. Network gateway 620 determines (682) based on, for example, the Status or Result indicator included in TokenBA', that a synchronization error was detected by secure element 608. Network gateway 620 sends a resynchronization request (684) to authentication center 640, where the resynchronization request includes TokenBA' together with the identity B of secure element 608.

In response to receiving the resynchronization request (684) from network gateway 620, authentication center 640 may validate the resynchronization request, perform a resynchronization operation, and generate new authentication tuples (686). Authentication center 640 may generate (686) a set of authentication tuples such as (B, TokenAB, TokenBA, $K_{PSK}$), and return (688) the set of generated tuples to network gateway 620. Upon receiving the set of authentication tuples from authentication center 640, network gateway 620 may save (692) an extended set of authentication tuples. For example, the network gateway 620 may save (692) an extended set of tuples (A, B, TokenAB, TokenBA, $K_{PSK}$), which includes the identity A of the authentication center 640 network gateway 620 pair. Network gateway 620 then sends (694) an indication back to mobile device 602 that the resynchronization was successful.

Figure 7:
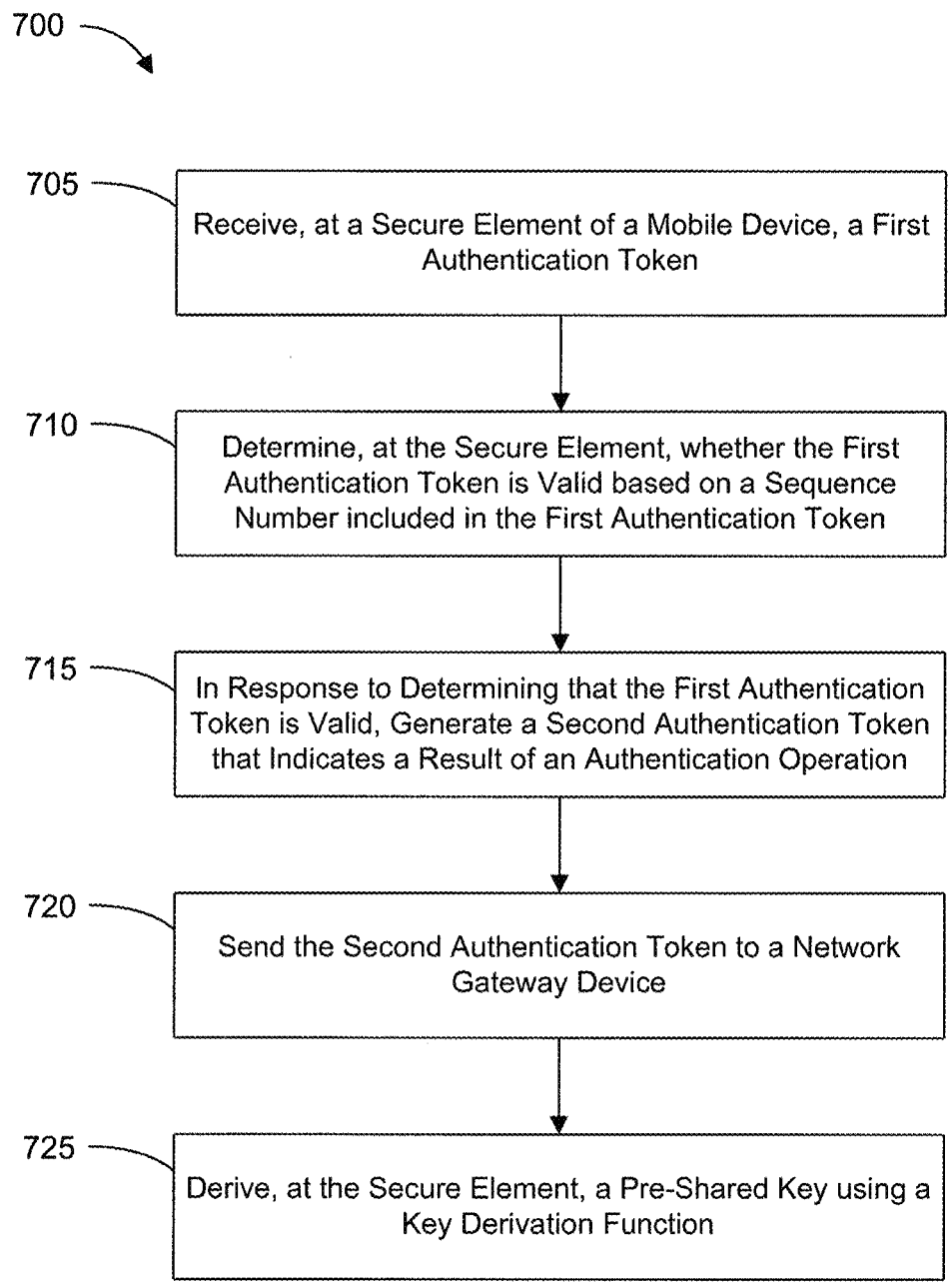
FIG. 7 is a flow diagram illustrating an example method for authenticating a mobile device and establishing a pre-shared key, according to one or more embodiments described herein.

FIG. 7 illustrates an exemplary process 700 for authenticating a mobile device and establishing a pre-shared key. For example, process 700 may be performed by a secure element located or installed in a mobile device (e.g., secure element 108 of mobile device 102, as shown in FIGS. 1-2). In such an embodiment, the secure element may be a UICC or SIM installed in the mobile device.

At block 705, the secure element of the mobile device may receive an authentication token. For example, the secure element may receive an authentication token similar to token 300 shown in FIG. 3 and described in detail above. In an embodiment, the authentication token received at block 705 may be TokenAB, as described above.

At block 710, the secure element may determine whether the authentication token received at block 705 is valid or correct based on a sequence number included in the first authentication token. For example, the secure element may analyze the sequence number (e.g., $N_B$) included in the received token to determine whether there is a sequence error in the received token. For example, if the sequence number included in the received token is determined by the secure element to be incorrect or invalid, then that may be interpreted or understood by the secure element as indicating that a resynchronization operation is necessary (e.g., that an authentication center from which the sequence number was provided has an unsynchronized value).

The secure element may determine (at block 710) whether the authentication token received at block 705 is valid or correct by comparing the sequence number (e.g., $N_B$) included in the received token (e.g., token 300, which may correspond to TokenAB) to a current value stored in a sequence counter of the secure element (e.g., sequence counter 256 in secure element 108 shown in FIG. 2). If the value of the sequence number ($N_B$) is no more than L larger (e.g., where L is the maximum sequence counter increment, as described above) than the current value stored in the sequence counter (or, stated differently, is within a threshold difference of the current value stored in the sequence counter), then the secure element may determine that the sequence number is acceptable and thus the received authentication token is valid. On the other hand, if the secure element determines that the sequence number included in the received token does not satisfy such a criteria, the secure element may determine that the received token is invalid (e.g., resynchronization is needed).

In response to determining at block 710 that the received authentication token is valid, the secure element may generate a second authentication token (e.g., token 400, which may also correspond to TokenBA) at block 715, where the second authentication token includes an indication of a result of an authentication operation performed by the secure element.

At block 720, the second authentication token generated at block 715 may be sent to a network gateway device. For example, the second authentication token may be sent to a network gateway device similar to network gateway device 120.

At block 725, the secure element may derive a pre-shared key (e.g., $K_{PSK}$). In an exemplary embodiment, the secure element derives the pre-shared key using a key derivation function such as, for example, the ANSI X9.63 key derivation function. The derived key may be usable to establish a secure communication channel (e.g., TLS) between the mobile device and the network gateway device.

Figure 8:
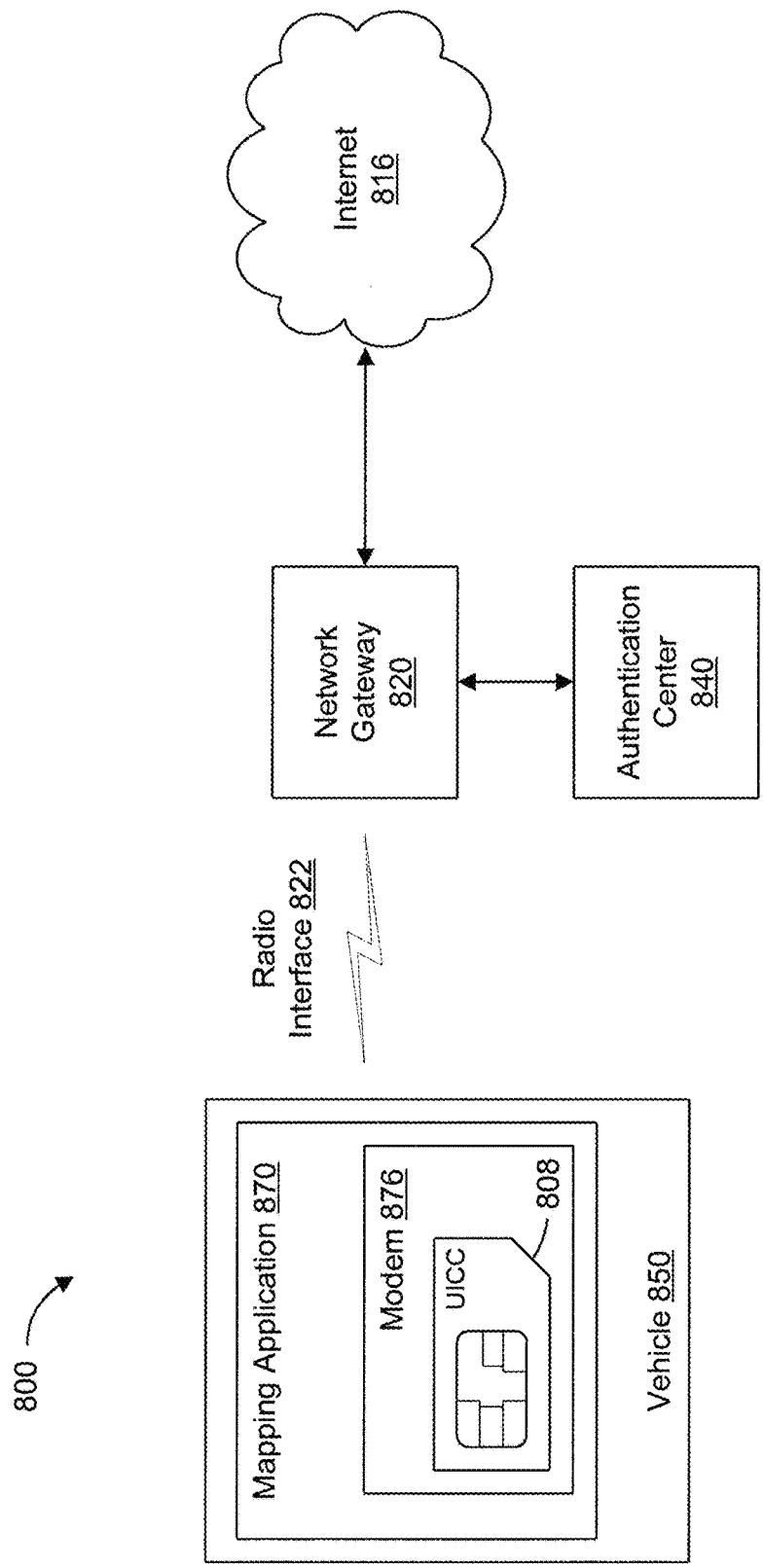
FIG. 8 is a block diagram illustrating an example system for authenticating a connected device and establishing a pre-shared key, according to one or more embodiments described herein.
Figure 9:
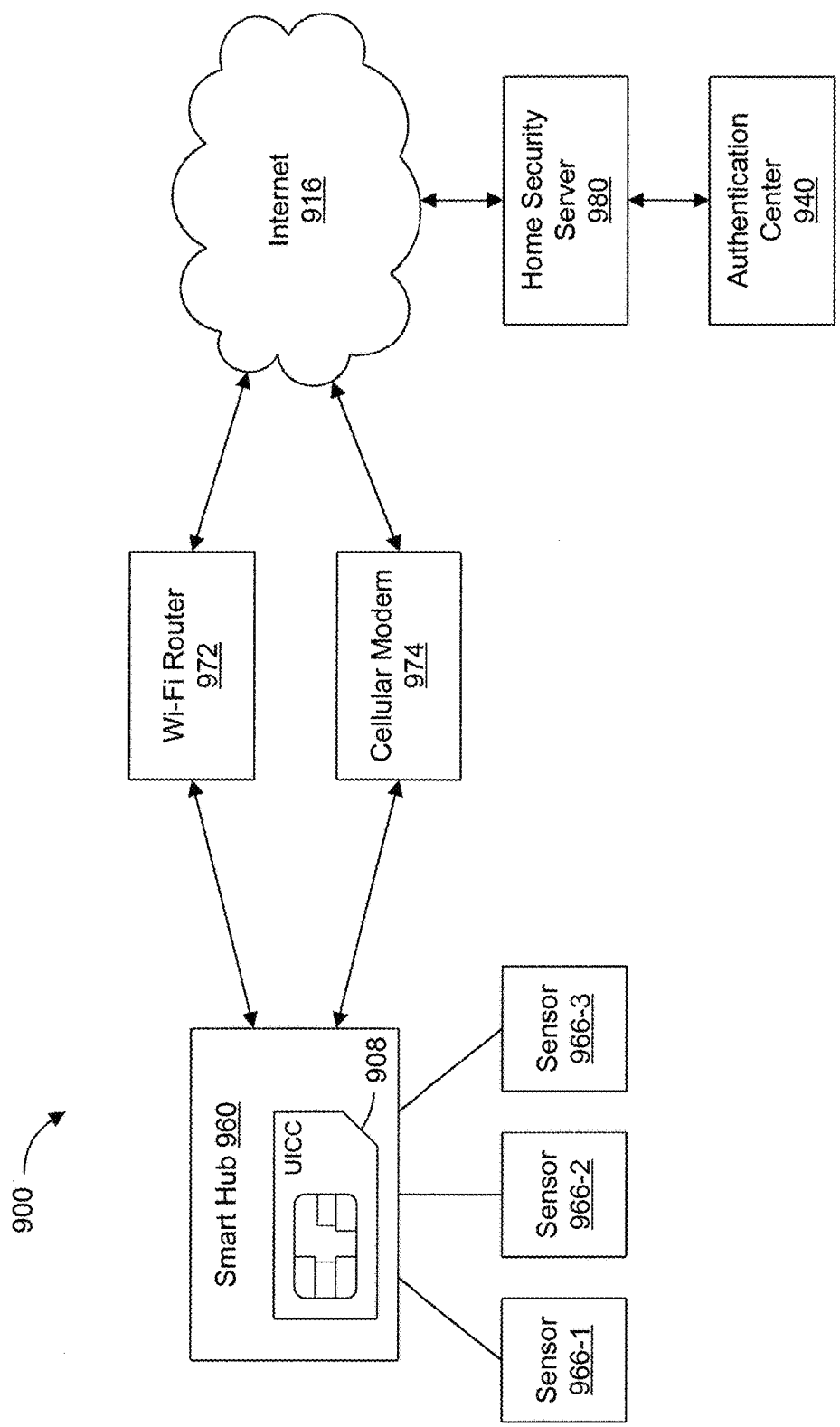
FIG. 9 is a block diagram illustrating an example system for authenticating a connected device and establishing a pre-shared key, according to one or more embodiments described herein.

FIGS. 8 and 9 are block diagrams illustrating additional exemplary systems for authenticating a connected device and establishing a pre-shared key. It should be noted that one or more of the components in the example systems 800 and 900 shown in FIGS. 8-9, respectively, may be similar in function and/or form to one or more corresponding components in the example system 100 shown in FIG. 1 and described in detail above.

FIG. 8 shows an example system 800 for authenticating a connected device and establishing a pre-shared key, where the system 800 is implemented in a motor vehicle (e.g., car, truck, bus, motorcycle, etc.). In accordance with an embodiment, a mapping application 870 installed in a vehicle 850 is configured to utilize a modem 876 that includes a secure element (e.g., UICC) 808. Mapping application 870 communicates via a radio interface 822 with a network gateway 820 to the Internet 816.

In an embodiment, the AKA application (as described above) is configured to run on secure element 808 present in modem 876 to establish a pre-shared key between the modem 876 (or mapping application 870) and secure network gateway 820. It should be noted that while the present example is described in the context of mapping application 870, a pre-shared key may also be provided for use by various other applications running in the vehicle 850 in addition to or instead of mapping application 870. For example, the pre-shared key may be provided for use by a telemetry application or some other application that typically relies on a secure data communication channel.

In an embodiment, the AKA application running on the secure element 808 may be used together with an authentication center 840 (e.g., server) to establish a secure TLS communication channel between mapping application 870 and network gateway 820. In at least one embodiment, a USIM application running on secure element 808 acts as the authentication module for the cellular radio link within vehicle 850.

FIG. 9 shows an exemplary system 900 for authenticating a connected device and establishing a pre-shared key, where system 900 is implemented in a home security application running on a smart hub 960, which may include a secure element 908 (e.g., UICC) that is connected to or includes a plurality of sensor devices 966-1, 966-2, and 966-3. It should be noted that while the present example is described in the context of a home security application running on a smart hub 960, system 900 may be implemented in the broader "Internet of Things" (IoT) context, and encompass various other types of inter-networked devices.

In an embodiment, smart hub 960 is configured to operate on a wireless local area network (e.g., in accordance with one or more communication protocols that conform to the IEEE 802.11 Standards or other wireless standards) of a house, and connect, via Wi-Fi Router 972 and the Internet 916 to a server 980 of the home security system provider associated with the home security application. In at least one embodiment, smart hub 960 utilizes TLS to secure this connection to home security server 980. Smart hub 960 may also be configured to use a cellular modem 974 to communicate to home security server 980 where, for example, the Wi-Fi connection is unavailable.

The AKA application running on secure element 908 may be used together with an authentication center 940 (e.g., server) to establish a secure TLS communication channel between smart hub 960 and home security server 980. In at least one embodiment, the system 900 does not include the cellular modem 974, and thus, secure element 908 need not contain a USIM application.

In some embodiments, the secure element (e.g., secure element 108, 808, 908, etc.) containing the AKA application described above may be a removable UICC in any of a variety of form factors including, but not limited to, 2FF (e.g., mini-SIM card), 3FF (e.g., micro-SIM card), and 4FF (e.g., nano-SIM card). The secure element may also be a UICC in any of a variety of embedded form factors, including, but not limited to, MFF2 (e.g., chip SIM, a QFN8 package), DFN8, and WLCSP.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any non-transitory computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts such as those described above.

When implemented in hardware, the hardware may comprise one or more of discrete components, an integrated circuit, an application-specific integrated circuit (ASIC), a programmable logic device (PLD), etc.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. No limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A system comprising:
a secure element of a mobile device; and
a network gateway device in communication with the mobile device via a first communication network,
wherein the secure element is configured to:
receive a first authentication token from the network gateway device,
determine whether the first authentication token is valid based on a sequence number included in an encrypted portion of the first authentication token, and
responsive to determining that the first authentication token is valid:
generate a second authentication token, wherein the second authentication token includes the sequence number from the first authentication token and indicates a status of an authentication operation performed by the secure element,
send the second authentication token to the network gateway device, and
derive a pre-shared key using a key derivation function, wherein the pre-shared key is usable to establish a secure communication channel with the network gateway device, wherein the network gateway device is configured to generate the first authentication token to include the encrypted portion and a non-encrypted portion, wherein the encrypted portion of the first authentication token includes a first text field, and wherein the first text field in the encrypted portion of the first authentication token includes (i) an identity of the network gateway device, (ii) the sequence number, and (iii) a secret value.

2. The system of claim 1, wherein the secure element is further configured to:

compare the sequence number included in the first authentication token to a current value of a sequence counter stored at the secure element; and determine, based on the comparison, whether the sequence number is within a threshold difference from the current value of the sequence counter.

3. The system of claim 1, wherein the secure element is further configured to:

responsive to determining, based on the sequence number, that the first authentication token is invalid:

generate a new sequence number, and send a third authentication token to the network gateway device, the third authentication token including the new sequence number.

4. The system of claim 1, wherein the secure element is further configured to:

derive the pre-shared key based on the secret value included in the first authentication token, an identity of the secure element, and the identity of the network gateway device.

5. The system of claim 1, wherein the encrypted portion of the first authentication token includes (i) an identity of the secure element, (ii) the identity of the network gateway device, (iii) a random number generated by the network gateway device to bind the first authentication token to the second authentication token, (iv) the sequence number, and (v) the secret value.

6. The system of claim 5, wherein the network gateway device is configured to:

generate the first authentication token to include the first text field and a second text field, the first text field included in the encrypted portion of the first authentication token, and the second text field included in the non-encrypted portion of the first authentication token.

7. The system of claim 1, further comprising:

an authentication server in communication with the network gateway device via a second communication network, the authentication server configured to:

generate the first authentication token; and send the first authentication token to the network gateway device.

8. A method comprising:

receiving, at a secure element of a mobile device, a first authentication token;

determining, at the secure element, whether the first authentication token is valid based on a sequence number included in an encrypted portion of the first authentication token;

responsive to determining that the first authentication token is valid:

generating, at the secure element, a second authentication token, wherein the second authentication token includes the sequence number from the first authentication token and indicates a result of an authentication operation performed by the secure element, sending the second authentication token to a network gateway device, and deriving, at the secure element, a pre-shared key using a key derivation function, wherein the pre-shared key is usable to establish a secure communication channel with the network gateway device, wherein the first authentication token includes the encrypted portion and a non-encrypted portion, wherein the encrypted portion of the first authentication token includes a first text field, and wherein the first text field in the encrypted portion of the first authentication token includes (i) an identity of the network gateway device, (ii) the sequence number, and (iii) a secret value.

9. The method of claim 8, wherein determining whether the first authentication token is valid based on the sequence number included in the first authentication token includes:

comparing the sequence number to a current value of a sequence counter stored at the secure element; and determining, based on the comparison, whether the sequence number is within a threshold difference from the current value of the sequence counter.

10. The method of claim 8, further comprising:

responsive to determining, based on the sequence number, that the first authentication token is invalid:

generating, at the secure element, a new sequence number; and sending a third authentication token to the network gateway device, the third authentication token including the new sequence number.

11. The method of claim 8, wherein the pre-shared key is derived at the secure element based on the secret value included in the first authentication token, an identity of the secure element, and the identity of the network gateway device.

12. The method of claim 8, wherein the encrypted portion of the first authentication token includes (i) an identity of the secure element, (ii) the identity of the network gateway device, (iii) a random number generated by the network gateway device to bind the first authentication token to the second authentication token, (iv) the sequence number, and (v) the secret value.

13. The method of claim 12, wherein the encrypted portion of the first authentication token includes the first text field and the non-encrypted portion of the first authentication device includes a second text field.

14. The method of claim 10, wherein the new sequence number is included in an encrypted portion of the third authentication token.

15. A non-transitory, computer-readable medium or media storing computer-readable instructions that, when executed by one or more processors, cause the one or more processors to perform operations comprising:

receiving a first authentication token;

determining whether the first authentication token is valid based on a sequence number included in an encrypted portion of the first authentication token;

responsive to determining that the first authentication token is valid:

generating a second authentication token, wherein the second authentication token includes the sequence number from the first authentication token and indicates a result of an authentication operation performed by the one or more processors, sending the second authentication token to a network gateway device, and deriving a pre-shared key using a key derivation function, wherein the pre-shared key is usable to establish a secure communication channel with the network gateway device, wherein the first authentication token includes the encrypted portion and a non-encrypted portion, wherein the encrypted portion of the first authentication token includes a first text field, and wherein the first text field in the encrypted portion of the first authentication token includes (i) an identity of the network gateway device, (ii) the sequence number, and (iii) a secret value.

16. The non-transitory, computer-readable medium or media of claim 15, further storing computer-readable instructions that, when executed by the one or more processors, cause the one or more processors to perform operations comprising:

comparing the sequence number included in the first authentication token to a current value of a sequence counter; and determining, based on the comparison, whether the sequence number is within a threshold difference from the current value of the sequence counter.

17. The non-transitory, computer-readable medium or media of claim 15, further storing computer-readable instructions that, when executed by the one or more processors, cause the one or more processors to perform operations comprising:

responsive to determining, based on the sequence number, that the first authentication token is invalid:
generating a new sequence number; and
sending a third authentication token to the network gateway device, the third authentication token including the new sequence number.

18. The non-transitory, computer-readable medium or media of claim 15, further storing computer-readable instructions that, when executed by the one or more processors, cause the one or more processors to perform operations comprising:

deriving the pre-shared key based on the secret value included in the first authentication token, an identity of the secure element, and the identity of the network gateway device.

* * * * *